US007049518B2

(12) United States Patent
Kimura et al.

(10) Patent No.: US 7,049,518 B2
(45) Date of Patent: May 23, 2006

(54) SHIELDED CABLE, PROCESS FOR ASSEMBLING THE SAME AND COMPRESSOR UNIT HAVING THE SAME

(75) Inventors: Kazuya Kimura, Kariya (JP); Ken Suitou, Kariya (JP); Akio Fujii, Kanazawa (JP)

(73) Assignee: Kabushiki Kaisha Toyota Jidoshokki (JP)

( * ) Notice: Subject to any disclaimer, the term of this patent is extended or adjusted under 35 U.S.C. 154(b) by 0 days.

(21) Appl. No.: 10/912,981

(22) Filed: Aug. 5, 2004

(65) Prior Publication Data

US 2005/0061535 A1 Mar. 24, 2005

(30) Foreign Application Priority Data

Aug. 7, 2003 (JP) ............................ 2003-289445

(51) Int. Cl.
*H02G 15/02* (2006.01)

(52) U.S. Cl. ..................................... 174/74 R; 361/27

(58) Field of Classification Search .............. 174/74 R, 174/75 C, 78, 84 R, 84 S, 84 C; 361/27
See application file for complete search history.

(56) References Cited

U.S. PATENT DOCUMENTS

| | | | | |
|---|---|---|---|---|
| 4,041,542 | A | 8/1977 | Pfarrer | 361/27 |
| 4,108,527 | A | 8/1978 | Douty et al. | 339/107 |
| 4,921,441 | A | 5/1990 | Sauder | 439/460 |
| 6,126,478 | A | 10/2000 | Presson et al. | 439/467 |
| 6,280,235 | B1 * | 8/2001 | Radliff | 439/467 |

FOREIGN PATENT DOCUMENTS

| | | | |
|---|---|---|---|
| EP | 0 986 135 | A1 | 3/2000 |
| EP | 1 100 158 | A2 | 5/2001 |
| EP | 1 336 760 | A2 * | 8/2003 |
| GB | 2 268 639 | | 1/1994 |
| JP | 10-159777 | | 6/1998 |
| JP | 2000/002182 | | 1/2000 |
| WO | WO 99/23727 | | 5/1999 |

OTHER PUBLICATIONS

U.S. Appl. No. 10/364,754, filed Dec. 5, 1995, Welsh et al.

* cited by examiner

*Primary Examiner*—William H. Mayo, III
(74) *Attorney, Agent, or Firm*—Woodcock Washburn LLP

(57) ABSTRACT

A shielded cable has a cable body providing an electromagnetic shielding portion around a conductive wire thereof, a connector fitted to one end of the cable body and having a casing including a conducting portion, and an electromagnetic shielding portion of the cable body conducted with the conducting portion of the casing in the connector. The shield conducting portion is provided on the conducting portion and includes first and second conducting members, which are located outside the electromagnetic shielding portion by being press-fitted into the casing for pressing the electromagnetic shielding portion in different directions, respectively. At least one of the first and second conducting members is made of a conductive material. The cable body is held by the first and second conducting members, so that the electromagnetic shielding portion is conducted with the conducting portion of the casing through the conducting member made of a conductive material.

9 Claims, 6 Drawing Sheets

SHIELDED CABLE, PROCESS FOR ASSEMBLING THE SAME AND COMPRESSOR UNIT HAVING THE SAME

BACKGROUND OF THE INVENTION

The present invention relates to a shielded cable including a cable body and a connector, wherein the cable body is constituted of a conductive wire and an electromagnetic shielding portion provided around the conductive wire, the connector being provided at one end of the cable body. The present invention also relates to a process for assembling the shielded cable and a compressor unit having the shielded cable.

For example, there is a compressor unit for use in a refrigerant circuit, the compressor unit having an electric compressor (a compressor body) as disclosed in page 4 and FIG. 1 of Unexamined Japanese Patent Publication No. 10-159777. The compressor body according to the above Publication provides a vacuum-tight electric terminal (terminal) in a sealed casing (housing) thereof for electrical connection between an electric motor body accommodated in the housing and an external power source (electrical circuit unit). Though not described in detail, generally a cable extending from the electrical circuit unit is detachably connected to a terminal of the housing through a connector fitted to one end of the cable.

Then, the cable having an electromagnetic shielding portion around a conductive wire may be used as countermeasures against contamination of electromagnetic environment. For example, in the connector, the electromagnetic shielding portion is conducted with a metallic casing of the connector and grounded by being conducted with a metallic housing of the compressor body through the casing thereby to exercise electromagnetic shielding effect. Conventionally, in the connector, there is a structure for conducting the electromagnetic shielding portion of the cable with the casing, such as a connecting structure by screwing fittings, a connecting structure by caulking a metallic portion on the side of the casing, and a connecting structure by soldering.

An unwanted feature is that when in a structure for conducting the electromagnetic shielding portion of the cable with the casing of the connector by screwing, caulking or soldering, a manufacturing process for the conduction becomes complicated thereby to result in higher manufacturing cost. That is, in order to reliably conduct the electromagnetic shielding portion with the casing, in other words, in order to reliably exercise electromagnetic shielding effect, screwing, caulking or soldering needs carefully and reliably be performed. However, it is complicated to carefully and reliably perform screwing, caulking or soldering in a narrow space in the connector. Therefore, there is a need for providing a shielded cable, a process for assembling the shielded cable and a compressor unit having the shielded cable for simply and reliably conducting an electromagnetic shielding portion of a cable body with a conducting portion of a casing in the connector.

SUMMARY OF THE INVENTION

In accordance with the present invention, a shielded cable has a cable body, a connector and a shield conducting portion. The cable body provides an electromagnetic shielding portion around a conductive wire thereof. The connector is fitted to one end of the cable body, the connector having a casing including a conducting portion. The electromagnetic shielding portion of the cable body is conducted with the conducting portion of the casing in the connector. The shield conducting portion is provided on the conducting portion of the casing and includes a first conducting member and a second conducting member. The first conducting member is located outside the electromagnetic shielding portion by being press-fitted into the casing for pressing the electromagnetic shielding portion. The second conducting member is located outside the electromagnetic shielding portion by being press-fitted into the casing for pressing the electromagnetic shielding portion in a different direction from the first conducting member. At least one of the first and second conducting members is made of a conductive material. The cable body is held by the first conducting member press-contacting with the electromagnetic shielding portion and the second conducting member press-contacting with the electromagnetic shielding portion, so that the electromagnetic shielding portion is conducted with the conducting portion of the casing through at least one of the first and second conducting members made of a conductive material.

Other aspects and advantages of the invention will become apparent from the following description, taken in conjunction with the accompanying drawings, illustrating by way of example the principles of the invention.

BRIEF DESCRIPTION OF THE DRAWINGS

The features of the present invention that are believed to be novel are set forth with particularity in the appended claims. The invention together with objects and advantages thereof, may best be understood by reference to the following description of the presently preferred embodiments together with the accompanying drawings in which:

DETAILED DESCRIPTION OF THE PREFERRED EMBODIMENTS

A first preferred embodiment in which the present invention is applied to a compressor unit, which is a part of a refrigerant circuit of a vehicle air conditioner, will now be described with reference to FIGS. 1 through 3A.

Figure 1:
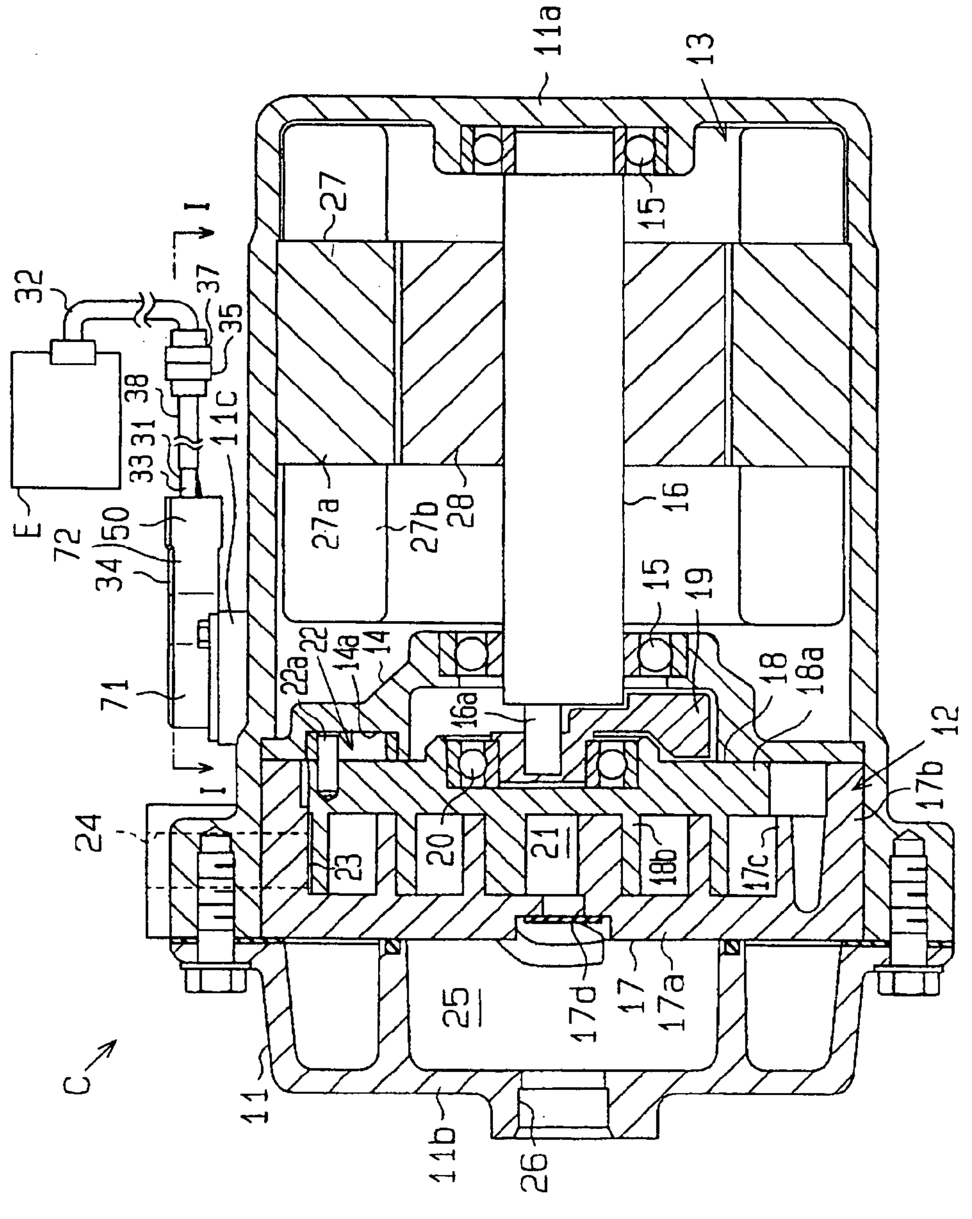
FIG. 1 is a schematic cross-sectional view of a compressor unit according to a first preferred embodiment.

FIG. 1 is a longitudinal cross-sectional view of an electric compressor or a compressor body C. The front side and the rear side of the electric compressor C respectively correspond to the right side and the left side of FIG. 1. The electric compressor C includes a compression mechanism 12, an electric motor 13 for driving the compression mechanism 12 and a housing 11 which accommodates therein the compression mechanism 12 and the electric motor 13. The housing 11 is made by die-casting an aluminum alloy and accommodates therein a rotary shaft 16. Both ends of the rotary shaft 16 are rotatably supported by bearings 15 which are respectively provided on a front end wall 11*a* and a support wall 14. The support wall is arranged in the housing 11*a* and located at the middle in the longitudinal direction of the housing 11.

The compression mechanism 12 is a scroll type including a fixed scroll member 17 and a movable scroll member 18. The fixed scroll member 17 has a disc-shaped base plate 17*a*, a cylindrical outer peripheral wall 17*b* extending from the outer peripheral side of the base plate 17*a*, and a fixed scroll wall 17*c* extending from the base plate 17*a* on the inner side of the outer peripheral wall 17*b*. The fixed scroll member 17 is fixedly connected to the housing 11 by press-fitting the outer peripheral wall 17*b*.

A crankshaft 16*a* is formed at the rear end surface of the rotary shaft 16 for rotatably supporting the movable scroll member 18 relative to the fixed scroll member 17 through a bushing 19 and a bearing 20 so as to face the fixed scroll member 17. The movable scroll member 18 has a disc-shaped base plate 18*a* and a movable scroll wall 18*b* extending rearward from the base plate 18*a*.

The fixed scroll member 17 and the movable scroll member 18 engage with each other through the fixed scroll wall 17*c* and the movable scroll wall 18*b*, while the distal ends of the fixed scroll wall 17*c* and the movable scroll wall 18*b* contact with the base plate 18*a*, 17*a* of the opposing scroll members 18, 17, respectively. Accordingly, the base plate 17*a* and the fixed scroll wall 17*c* of the fixed scroll member 17 and the base plate 18*a* and the movable scroll wall 18*b* of the movable scroll member 18 cooperatively form compression chambers 21.

A known self-rotation blocking mechanism 22 includes a cylindrical recess 14*a* formed in the support wall 14 and a pin 22*a* loosely fitted in the cylindrical recess 14*a*, and is interposed between the base plate 18*a* of the movable scroll member 18 and the support wall 14 facing the base plate 18*a*.

A suction chamber 23 is formed between the outer peripheral wall 17*b* of the fixed scroll member 17 and the outermost peripheral portion of the movable scroll wall 18*b* of the movable scroll member 18. The suction chamber 23 is connected to an external conduit through a suction passage 24 formed in the outer peripheral portion of the housing 11, the external conduit being connected to an evaporator of an external refrigerant circuit (not shown).

A discharge chamber 25 is formed in the housing 11 on the rear side of the fixed scroll member 17 thereby to introduce thereto refrigerant gas discharged from the compression chamber 21. The discharge chamber 25 is connected to an external conduit through a discharge passage 26 formed in a rear end wall 11*b* of the housing 11, the external conduit being connected to a gas cooler of the external refrigerant circuit (not shown).

A stator 27 which is a part of the electric motor 13 is provided on the inner peripheral surface of the housing 11 on the front side relative to the support wall 14. The stator 27 includes a cylindrical iron core 27*a* and a coil 27*b* wound around the iron core 27*a*. Inside the stator 27, a rotor 28 constituted of magnet is fixedly arranged on the rotary shaft 16. The stator 27 and the rotor 28 cooperatively form the electric motor 13 having a brushless DC motor.

As the rotary shaft 16 is rotated by the electric motor 13, the movable scroll member 18 orbits around the axis of the fixed scroll member 17 through the crankshaft 16*a* in the compression mechanism 12. Then, the movable scroll member 18 is prevented from rotating by the self-rotation blocking mechanism 22 and permitted to orbit only. This orbital motion of the movable scroll member 18 makes the compression chambers 21 to move from the outer peripheral side of the scroll walls 17*c*, 18*b* of the scroll members 17, 18 toward the center thereof with reducing in volume thereby to compress refrigerant gas introduced from the suction chamber 23 into the compression chambers 21. The compressed refrigerant gas is discharged to the discharge chamber 25 through a discharge port 17*d* which is formed in the base plate 17*a* of the fixed scroll member 17, and then is sent to the external refrigerant circuit through the discharge passage 26.

The compressor unit according to the first preferred embodiment has the electric compressor C and an inverter circuit or an electrical circuit unit E for controlling electric current supplied to the electric motor 13 of the electric compressor C. The inverter circuit E includes a plurality of phase inverter circuits (three in the first preferred embodiment), which are not shown in FIG. 1. The coil 27*b* of the stator 27 of the electric motor 13 is electrically connected to the alternating current output terminal of each corresponding phase inverter circuit through a shielded cable 31 and a cable 32.

(Shielded Cable and Connecting Structure between Shielded Cable and Electric Compressor)

Figure 2A:
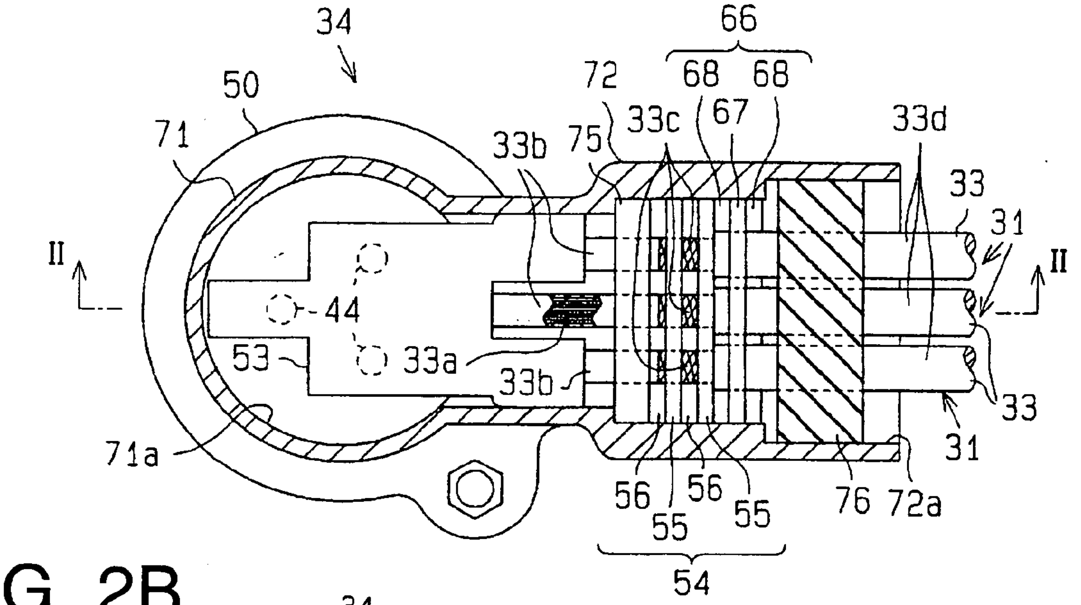
FIG. 2A is a cross-sectional view that is taken along the line I—I in FIG. 1.
Figure 2B:
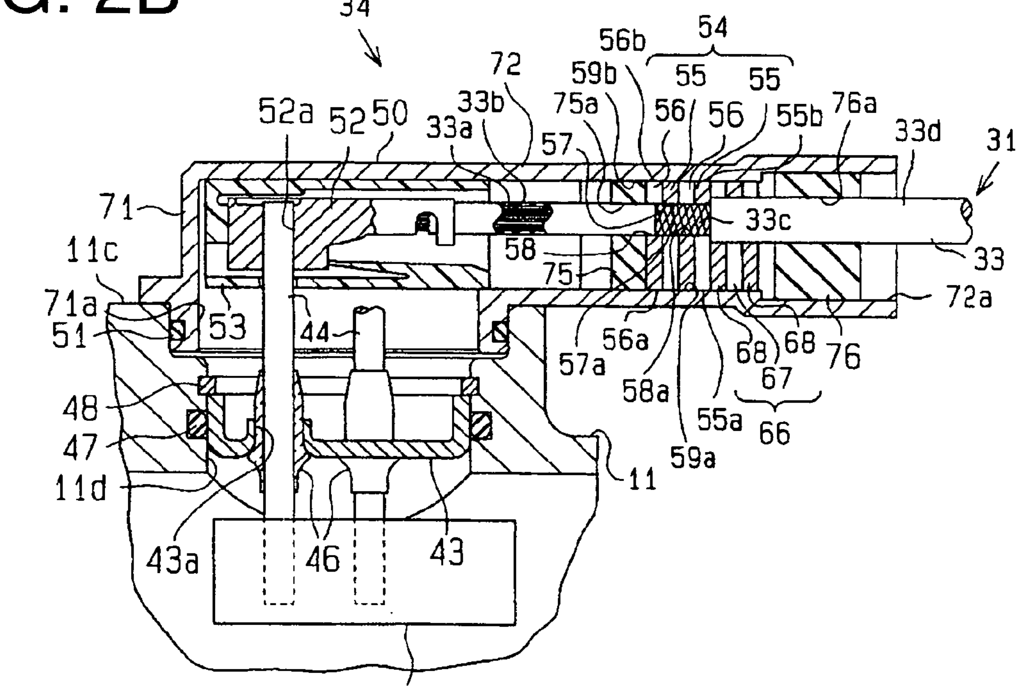
FIG. 2B is a cross-sectional view that is taken along the line II—II in FIG. 2A.

As shown in FIGS. 1, 2A and 2B, the shielded cable 31 includes a plurality of cable bodies 33 (three in the first preferred embodiment for corresponding to the number of the alternating current output terminal of the phase inverter), a compressor-side connector 34 for tying one ends of the plural cable bodies 33, and a relay connector 35 for tying the other ends of the plural cable bodies 33. The plural cable bodies 33 are tied with each other by a tying tube 38.

Each cable body 33 includes a conductive wire or a core wire 33*a*, an inner insulating layer 33*b* for covering the conductive wire 33*a*, an electromagnetic shielding portion 33*c* constituted of braided wire for covering the inner insulating layer 33*b*, and an outer insulating layer 33*d* for covering the electromagnetic shielding portion 33*c*. One end of each cable body 33 located in the compressor-side connector 34 is gradually peeled to expose the conductive wire 33*a*, the inner insulating layer 33*b* and the electromagnetic shielding portion 33*c* in this order from its distal end.

The relay connector 35 of the shielded cables 31 is connected to a relay connector 37 of the cables 32. Accordingly, each conductive wire 33*a* of the cable body 33 is connected to the inverter circuit E (alternating current output terminal) through a conductive wire (not shown) of the cable 32. Each cable 32 also has an electromagnetic shielding structure similar to the shielded cable 31. Each electromagnetic shielding portion 33*c* of the cable body 33 is connected to an electromagnetic shielding portion (not shown) of the cable 32. The shielded cable 31 and the cable 32 each having an electromagnetic shielding structure are used for connection between the electric compressor C and the inverter circuit E thereby to be efficiently used as countermeasures against contamination of electromagnetic environment.

As shown in FIGS. 2A and 2B, a boss 11*c* extends from the outer peripheral portion of the housing 11 of the electric compressor C. The compressor-side connector 34 of the shielded cables 31 is detachably connected to the boss 11*c*.

A communication hole 11*d* is formed in the boss 11*c* for communication between the outside and inside of the housing 11. A metallic support member 43 is fixedly inserted in the communication hole 11*d*. A plurality of through holes 43*a* (three in the first preferred embodiment) is formed in the support member 43. A terminal 44 constituted of a metallic pin is loosely fitted in each through holes 43*a*. Each terminal 44 is welded to the support member 43 through a glass welding portion 46.

An O-ring 47 is fitted to the inner peripheral surface of the communication hole 11*d* for sealing a gap between the inner peripheral surface and the outer peripheral surface of the support member 43. A retaining ring 48 is fitted in the communication hole 11*d* for preventing the support member 43 from slipping out toward the outer side of the housing 11. In each terminal 44, the end located inside the housing 11 is accommodated in a shared resin casing 49, while being connected to the corresponding coil 27*b* of the electric motor 13.

The compressor-side connector 34 has a metallic casing or a conductor 50. That is, in the first preferred embodiment, the entire casing 50 can be regarded as a conducting portion of thereof. The casing 50 includes a substantially cylindrical fitting portion 71 and a substantially rectangular casing body 72 which is integrally formed with the fitting portion 71. In a state where the compressor-side connector 34 is fitted to the boss 11*c* of the electric compressor C, the fitting portion 71 is being inserted into the communication hole 11*d*. Another O-ring 51 is fitted to the outer peripheral surface of the fitting portion 71 for sealing a gap between the outer peripheral surface and the inner peripheral surface of the communication hole 11*d*. In a state where the fitting portion 71 of the casing 50 is being inserted into the communication hole 11*d* of the housing 11, one end of each terminal 44 outside the housing 11 protrudes into the casing 50 through an inner space 71*a* of the fitting portion 71.

The casing body 72 of the casing 50 forms a cable insertion opening 72*a* at one end opposite to the fitting portion 71. One end of each cable body 33 is inserted into the casing 50 through the cable insertion opening 72*a*. A wire conducting portion or a fitting 52 is fixed to one end of each cable body 33 in the casing 50. Each wire conducting portion 52 is conducted with the conductive wire 33*a* of the cable body 33, while being fitted and connected to the terminal 44. The terminal 44 is fitted into a through hole 52*a* formed in the wire conducting portion 52 in a state where the compressor-side connector 34 is being fitted to the boss 11*c* thereby to be electrically connected to the wire conducting portion 52.

A resin casing 53 is accommodated in the casing 50. The wire conducting portions 52 corresponding to the respective cable bodies 33 are fixedly accommodated in one resin casing 53, and is located to correspond with the terminals 44 in a state where the compressor-side connector 34 is being fitted to the boss 11*c*.

In the cable body 33, the exposed portion of the electromagnetic shielding portion 33*c* in the casing 50 is conducted with the casing 50 through a shield conducting portion 54 located in the casing 50. Accordingly, the electromagnetic shielding portions 33*c* of the respective shielded cables 31 and electromagnetic shielding portions (not shown) of the respective cables 32 are grounded by being conducted with the housing 11 of the electric compressor C thereby to exercise electromagnetic shielding effect.

In the casing body 72 of the casing 50, a dustproof rubber member 75 for preventing foreign substance from being introduced is fitted between the shield conducting portion 54 and the wire conducting portion 52. The dustproof rubber member 75 forms therein a plurality of through holes 75*a* (three in the first preferred embodiment) for allowing the corresponding cable bodies 33 to be inserted. The dustproof rubber member 75 prevents foreign substance from being introduced from the side of the shield conducting portion 54 to the side of the wire conducting portion 52 through a gap between the cable bodies 33 and the inner surface of the casing body 72 of the casing 50.

In the casing body 72 of the casing 50, a rubber member 76 is fitted near the cable insertion opening 72*a*. The rubber member 76 forms therein a plurality of through holes 76*a* (three in the first preferred embodiment) for separately inserting each cable body 33 (strictly, a portion having the outer insulating layer 33*d*). The rubber member 76 prevents water and the like from being introduced into the casing 50 (the side of the shield conducting portion 54) through a gap between the cable bodies 33 and the inner surface of the casing body 72.

It is noted that the cable insertion opening 72*a* has a portion where the rubber member 76 is fitted, and the portion has a larger passing cross-sectional area than the portion where the shield conducting portion 54 is provided. Accordingly, the inner surface of the portion where the rubber member 76 is fitted in the cable insertion opening 72*a* is hardly damaged when press-fitting the first and second conducting members 55, 56 and the first and second fixing members 67, 68. Thus, the inner surface and the rubber member 76 are efficiently adhesive to each other thereby to efficiently exercise waterproof effect of the rubber member 76.

(Shield Conducting Portion)

As shown in FIGS. 2A and 2B, the shield conducting portion 54 has the first and second conducting portions 55, 56 which are press-fitted into the casing body 72 of the casing 50 through the cable insertion opening 72*a*. The first conducting member 55 is located outside the exposed portion of the electromagnetic shielding portion 33*c* to press the electromagnetic shielding portion 33*c* toward the lower side of FIG. 2B. The second conducting member 56 is located outside the electric shielding portion 33*c* to press the electromagnetic shielding portion 33*c* toward the side (the upper side of FIG. 2B) opposite to the first conducting member 55. The first and second conducting members 55, 56 each are made of metal as a conductor. The cable bodies 33 are held by the first conducting member 55 pressing against the electromagnetic shielding portion 33*c* and the second conducting member 56 pressing against the electromagnetic shielding portion 33*c*, thereby to ensure conduction between the electromagnetic shielding portion 33*c* and the casing 50 through the first and second conducting members 55, 56.

The first and second conducting members 55, 56 each are plate-like in shape and are layered in the longitudinal direction of the cable bodies 33. The first and second conducting members 55, 56 each are manufactured by pressing. The first and second conducting members 55, 56 each are plurally formed (two of each in the first preferred embodiment), and the first and second conducting members 55, 56 each are alternately layered such that the same conducting members 55, 56 are not adjacent thereto. Accordingly, the shield conducting portion 54 partially has such a layer structure that the first conducting member 55 is arranged on each side of the second conducting member 56. The first and second conducting members 55, 56 are pressed with their outer peripheries against first and second pressing surfaces 59*a*, 59*b*, which are formed to face each other in the casing 50, by being press-fitted into the casing 50. It is noted that the first and second conducting members 55, 56 are inserted such that the second conducting member 56 on the bottom (on the side of the dustproof member 75) contacts with the dustproof member 75.

The first conducting member 55 forms therein a plurality of inserting portions 57 (three in the first preferred embodiment) which form oblong recesses in shape for inserting the cable bodies 33 in the through-thickness direction. The first conducting member 55 is pressed to contact with the electromagnetic shielding portion 33*c* of the cable body 33 by an inner surface 57*a* of the inserting portion 57. Similarly, the second conducting member 56 forms therein a plurality of inserting portions 58 (three in the first preferred embodiment) which form oblong recesses for inserting the cable bodies 33 in the through-thickness direction. The second conducting member 56 is pressed to contact with the electromagnetic shielding portion 33*c* of the cable body 33 by an inner surface 58*a* of the inserting portion 58.

Figure 3A:
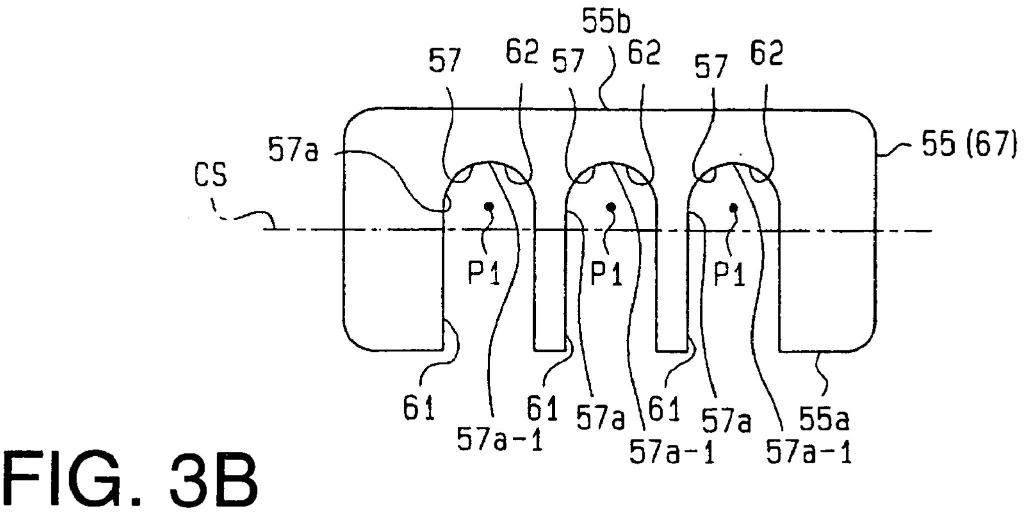
FIG. 3A is a schematic view of a first conducting member according to the first preferred embodiment of the present invention.
Figure 3B:
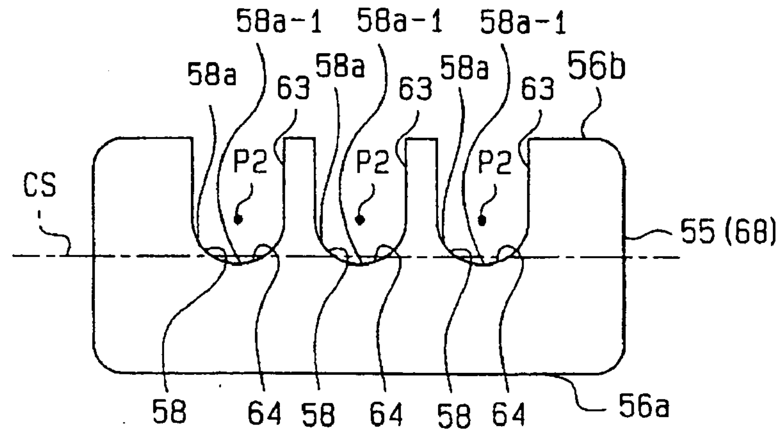
FIG. 3B is a schematic view of a second conducting member according to the first preferred embodiment of the present invention.

As shown in FIGS. 3A and 3B, the first and second conducting members 55, 56 form substantially rectangular in shape, the long side of which extends in the direction in which the cable bodies 33 are arranged (the right and left direction in FIGS. 3A and 3B). The first and second conducting members 55, 56 are press-fitted into the casing 50, so that first ends 55*a*, 56*a*, one of the long sides of the outer periphery (the lower side in FIGS. 3A and 3B), are pressed against the first press fitting surface 59*a* of the casing 50, as shown in FIG. 2B. The first and second conducting members 55, 56 are press-fitted into the casing 50, so that second ends 55*b*, 56*b*, the other long sides of the outer periphery (the upper side in FIGS. 3A and 3B), are pressed against the second press fitting surface 59*b* of the casing 50.

As shown in FIG. 3A, each inserting portion (oblong recess) 57 of the first conducting member 55 is formed to cut off the linear first end 55*a*. The inserting portion 57 includes a releasing portion 61 extending in a certain width from the first end 55*a* toward the second end 55*b* and a semi-circular holding portion 62 connecting with the releasing portion 61. The width of the releasing portion 61 and the diameter of the holding portion 62 are slightly larger than the diameter of the electromagnetic shielding portion 33*c* of the cable body 33. This leads to easy insertion of the cable body 33 into the inserting portion 57.

The releasing portion 61 extends over a center line CS between the first end 55*a* and the second end 55*b* to the second end 55*b*. Accordingly, a central axis P1 of the holding portion 62 is located closer to the second end 55*b* than the center line CS between the first end 55*a* and the second end 55*b*.

As shown in FIG. 3B, each inserting portion (oblong recess) 58 of the second conducting member 56 is formed to cut off the linear second end 56*b*. The inserting portion 58 includes a releasing portion 63 extending in a certain width from the second end 56*b* toward the first end 56*a* and a semi-circular holding portion 64 connecting with the releasing portion 63. The width of the releasing portion 63 is substantially equal to the width of the releasing portion 61 of the inserting portion 57, and the diameter of the holding portion 64 is substantially equal to the diameter of the holding portion 62 of the inserting portion 57. This leads to easy insertion of the cable body 33 into the inserting portion 58.

The releasing portion 63 extends toward the second end 55*b* without passing over the center line CS between the first end 56*a* and the second end 56*b*. Accordingly, a central axis P2 of the holding portion 64 is located closer to the second end 55*b* than the center line CS between the first end 56*a* and the second end 56*b*. The central axis P2 of the holding portion 64 is located to be slightly offset from the central axis P1 of the holding portion 62 of the inserting portion 57 of the first conducting member 55 toward the second end 56*b* in a state where the first conducting member 55 and the second conducting member 56 are layered.

Figure 3C:
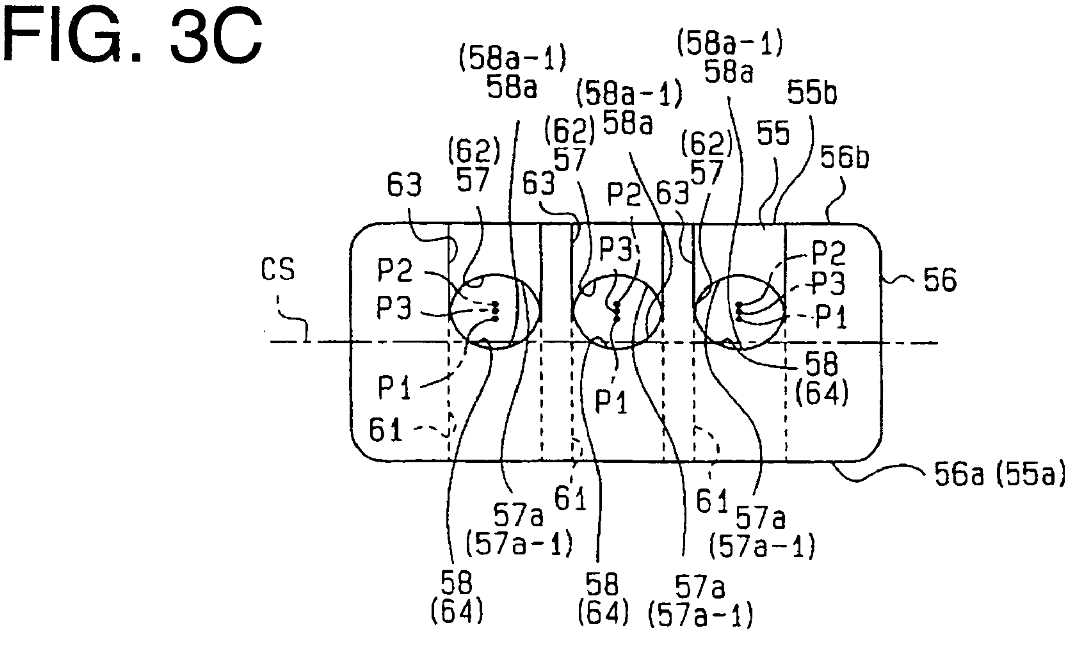
FIG. 3C is a schematic view in a state where the first conducting member and the second conducting member are layered according to the first preferred embodiment of the present invention.

As shown in FIG. 3C, as the first conducting member 55 and the second conducting member 56 are layered, the shape formed by the outline of the holding portion 62 of the inserting portion 57 and the outline of the holding portion 64 of the inserting portion 58 is elliptical with a smaller length in its vertical direction than the diameter of the electromagnetic shielding portion 33*c*, as seen from the front end (perpendicular direction relative to the paper of FIG. 3C) of the layered conducting members 55, 56. The cable bodies 33 are respectively inserted into the holding portions 62 of the inserting portions 57 and the holding portions 62 of the inserting portions 58 so as to pass substantially an intermediate position between the central axis P1 and the central axis P2. Accordingly, the inner surfaces 57*a*, 58*a* of the respective inserting portions 57, 58 are respectively pressed to contact with the electromagnetic shielding portion 33*c* by portions of cylindrical surface regions 57*a*-1, 58*a*-1 corresponding to the holding portions 62, 64. That is, the exposed portion of the electromagnetic shielding portion 33*c* in the casing 50 are press-contacted by the cylindrical surface region 57*a*-1 of the inner surface 57*a* of the inserting portion 57 and the cylindrical surface region 58*a*-1 of the inner surface 58*a* of the inserting portion 58 alternately in the longitudinal direction (the direction of the central axis P3) of the cable bodies 33 in accordance with the alternately layered structure of the first conducting member 55 and the second conducting member 56.

(Cable Fixing Portion)

As shown in FIGS. 2A and 2B, in the casing body 72 of the casing 50, a cable fixing portion 66 is provided between the shield conducting portion 54 and the rubber member 76 for fixing one ends of the cable bodies 33 to the compressor-side connector 34. The structure for fixing the cable bodies 33 to the compressor-side connector 34 by the cable fixing portion 66 employs the same manner as the structure for holding the cable bodies 33 in the compressor-side connector 34 by the shield conducting portion 54.

The cable fixing portion 66 has the first fixing member 67 which is press-fitted into the casing body 72 of the casing 50 and located outside the cable bodies 33 for pressing the outer insulating layers 33*d* of the cable bodies 33. The cable fixing portion 66 has the second fixing member 68 which is press-fitted into the casing body 72 of the casing 50 and located outside the cable bodies 33 for pressing the outer insulating layers 33*d* of the cable bodies 33 toward the opposite direction from the first fixing member 67. The first fixing member 67 and the second fixing member 68 press to sandwich the cable bodies 33, so that one ends of the cable bodies 33 are fixed to the compressor-side connector 34.

As shown in FIG. 3A, the first fixing member 67 is made from a plate member which has substantially the same dimension and shape as the first conducting member 55, except for different dimension of the inserting portion 57 (the width of the releasing portion 61 and the diameter of the holding portion 62). Accordingly, the same reference numerals for the first fixing member 67 denote the substantially identical components to the first conducting member 55, and description is omitted. As shown in FIG. 3B, the second fixing member 68 is made from a plate member which has substantially the same dimension and shape as the second conducting member 56, except for different dimension of the inserting portion 58 (the width of the releasing portion 63 and the diameter of the holding portion 64). Accordingly, the same reference numerals for the second fixing member 68 denote the substantially identical components to the second conducting member 56, and description is omitted.

The cable fixing portion 66 holds the cable bodies 33 at the outer insulating layer 33*d*. On the other hand, the shield conducting portion 54 holds the cable bodies 33 at the electromagnetic shielding portion 33*c* which is smaller in diameter than the outer insulating layer 33*d*. Accordingly, the inserting portion 57 of the first fixing member 68 is made larger by diameter difference between the outer insulating layer 33*d* and the electromagnetic shielding portion 33*c* than that of the first conducting member 55. Likewise, the inserting portion 58 of the second fixing member 68 is also made larger by diameter difference between the outer insulating layer 33*d* and the electromagnetic shielding portion 33*c* than that of the second conducting member 56.

It is noted that the width of the releasing portion 61 and the diameter of the holding portion 62 in the first fixing member 67, the width of the releasing portion 63 and the diameter of the holding portion 64 in the second fixing portion 68 are made slightly larger than the diameter of the outer insulating layer 33*d*. This leads to easy insertion of the cable body 33 to the inserting portion 57 of the first fixing member 67 and the inserting portion 58 of the second fixing member 68.

The cable fixing portion 66 has a tri-layered structure which the second fixing member 68 is arranged on each side of the first fixing member 67. In the cable fixing portion 66, the second fixing member 68 near the shield conducting portion 54 is layered on the first conducting member 55 near the cable fixing portion 66 in the shield conducting portion 54. Accordingly, the shield conducting portion 54 and the cable fixing portion 66 have a seventhly-layered structure as a whole.

(Assembling Process of Shielded Cable)

In the assembling process of the shielded cable 31, when one ends of the cable bodies 33 are assembled to the compressor-side connector 34, the cable bodies 33 are initially inserted into the respective through holes 76*a* of the rubber member 76. In this state, the first and second conducting members 55, 56 are located outside the electromagnetic shielding portion 33*c* at one ends of the cable bodies 33, while the first and second fixing members 67, 68 are located outside the outer insulating layer 33*d* at one ends of the cable bodies 33. That is, the seventhly-layered structure of the shield conducting portion 54 and the cable fixing portion 66 are previously prepared at a predetermined position of the cable bodies 33 outside the casing 50.

In this state, one end of each cable body 33 is inserted into the casing 50 through the cable insertion opening 72*a* of the casing 50, while the first conducting member 55, the second conducting member 56, the first fixing member 67 and the second fixing member 68 are press-fitted into the casing 50 through the cable insertion opening 72*a* in the above described order for layering, as shown in FIG. 2B. Accordingly, the first and second fixing members 67, 68 have been conducted with the casing 50 at the same time when the first and second conducting members 55, 56 are press-fitted into the casing 50, while one ends of the cable bodies 33 have been fixed to the compressor-side connector 34 at the same time when the first and second fixing members 67, 68 are press-fitted into the casing 50. After the press-fitting is finished, the rubber member 76 is fitted into the cable insertion opening 72*a*.

According to the first preferred embodiment, the following advantageous effects are obtained.

(1) In the compressor-side connector 34 of the shielded cable 31, the first and second conducting members 55, 56 are press-fitted into the casing 50. Accordingly, the first and second conducting members 55, 56 are easily and firmly conducted with the casing 50. Also, the cable bodies 33 of the shielded cables 31 held such that the first conducting member 55 is pressed to contact with the electromagnetic shielding portion 33*c* and the second conducting member 56 is pressed to contact with the electromagnetic shielding portion 33*c*. Accordingly, the first and second conducting members 55, 56 are easily and firmly conducted with the electromagnetic shielding portion 33*c*. That is, according to the first preferred embodiment, the electromagnetic shielding portion 33*c* is easily and firmly conducted with the casing 50 in the compressor-side connector 34. Such method is particularly efficient for a structure for tying a plurality of the cable bodies 33 into one compressor-side connector 34 as in the first preferred embodiment.

(2) The first and second conducting members 55, 56 are plate-like and are layered in the longitudinal direction of the cable bodies 33. The plate-like first and second conducting members 55, 56 and the layered first and second conducting members 55, 56 lead to saving a space for the shield conducting portion 54 in the casing 50 thereby to reduce the size of the compressor-side connector 34.

(3) The first and second conducting members 55, 56 respectively have a plurality of the inserting portions 57, 58 corresponding to a plurality of the cable bodies 33. Accordingly, in comparison to a structure that a plurality of the cable bodies 33 is inserted into one inserting portion 57, 58 (this example does not depart from the concept of the present invention), the cable bodies 33 are held stably. Thus, the first and second conducting members 55, 56 are further firmly conducted with the electromagnetic shielding portions 33$c$ of the cable bodies 33.

(4) The inserting portions 57, 58 of the respective first and second conducting members 55, 56 employ oblong recesses. Accordingly, the cable bodies 33 may be inserted into the inserting portions 57, 58 not only from the front (the right and left directions in FIGS. 2A ad 2B) of the inserting portions 57, 58 but also from the side (the lower side of FIG. 2A and the upper side of FIG. 2B) of the inserting portions 57, 58. Accordingly, there is a degree of freedom in procedure for inserting the cable bodies 33 into the first and second conducting members 55, 56 thereby to easily assemble the shielded cables 31. That is, for example, when the inserting portions 57, 58 form holes in shape, to form a layered structure of the first and second conducting members 55, 56, the cable bodies 33 need be inserted into the first and second conducting members 55, 56 in order of the layered structure.

(5) The first conducting member 55 is plurally provided. Accordingly, the cable bodies 33 are held stably by the first conducting member 55 and the second conducting member 56 thereby to firmly conduct the first and second conducting members 55, 56 with the electromagnetic shielding portions 33$c$. Additionally, the shield conducting portion 54 partially includes a layered structure which the first conducting member 55 is located on each side of the second conducting member 56. Accordingly, the cable bodies 33 are further stably held by the first conducting member 55 and the second conducting member 56.

(6) As the first and second fixing members 67, 68 are press-fitted into the casing 50, the cable bodies 33 are held by the first fixing member 67 and the second fixing member 68, so that one ends of the cable bodies 33 are fixed to the compressor-side connector 34. That is, for example, in comparison to a structure for fixing one ends of the cable bodies 33 to the compressor-side connector 34 by means of caulking and the like, one ends of the cable bodies 33 are easily and firmly fixed.

(7) In the casing 50, the dustproof rubber member 75 is arranged between the shield conducting portion 54 and the wire conducting portion 52 which is conducted with the conductor 33$a$ of the shielded cable 31 for preventing foreign substance from being introduced from the side of the shield conducting portion 54 into the side of the wire conducting portion 52. Accordingly, for example, even if the first and second conducting members 55, 56 are press-fitted into the casing 50 and metal shavings are produced as the first and second press fitting surfaces 59$a$, 59$b$ of the casing 50 are shaved, the metal shavings are prevented from being introduced into the side of the wire conducting portion 52. Additionally, the dustproof rubber member 75 contacts with the shield conducting portion 54. Accordingly, when the shield conducting portion 54 is press-fitted into the casing 50, the first and second conducting members 55, 56 are prevented from being inclined by the contact thereby to stabilize the position thereof. Furthermore, the dustproof rubber member 75 is located at a further bottom side in the casing 50 than the first and second conducting members 55, 56 thereby to prevent the first and second conducting members 55, 56 from being press-fitted in the casing 50 toward the bottom more than necessary.

(8) In the assembling process of the shielded cables 31, one ends of the cable bodies 33 are being inserted into the casing 50 through the cable insertion opening 72$a$ of the casing 50, while the first and second conducting members 55, 56, which are previously located outside the electromagnetic shielding portion 33$c$, are press-fitted into the casing 50 through the cable insertion opening 72$a$. Accordingly, the electromagnetic shielding portion 33$c$ of the cable body 33 has been conducted with the casing 50 at the same time when the first and second conducting members 55, 56 are press-fitted into the casing 50. Thus, the electromagnetic shielding portion 33$c$ is further simply conducted with the casing 50 as compared with the prior art.

A second preferred embodiment of the present invention will now be described with reference to FIGS. 4A through 6C. The same reference numerals denote the substantially identical components to those of the first preferred embodiment. Only different components from the first preferred embodiment will be described, and the identical components are not described.

Figure 4A:
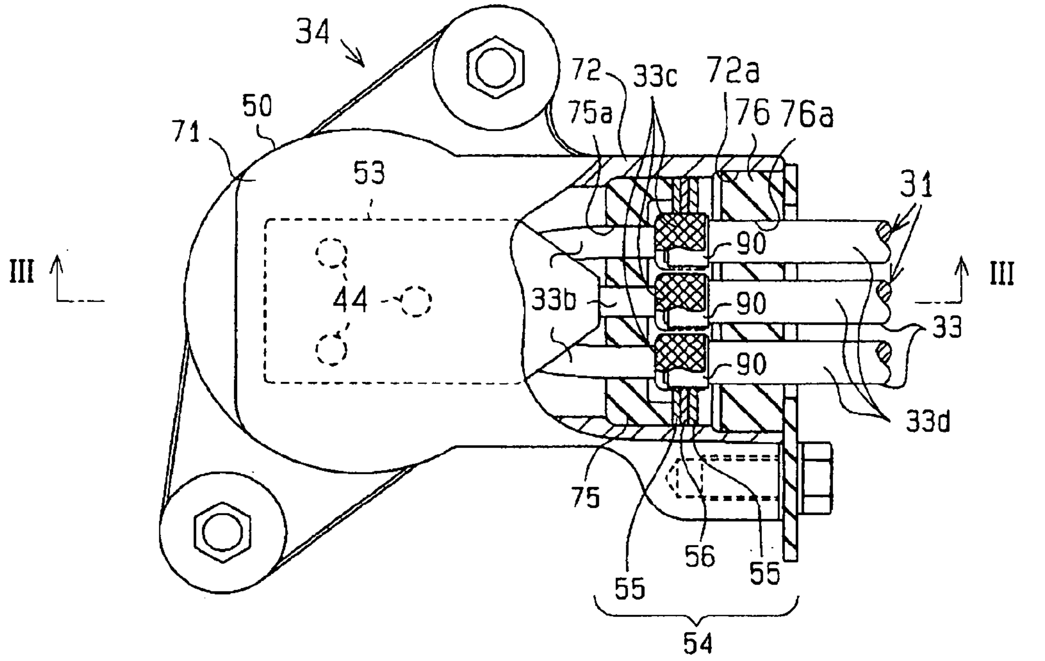
FIG. 4A is a plan view of a compressor-side connector with a partial cross section according to a second preferred embodiment of the present invention.
Figure 4B:
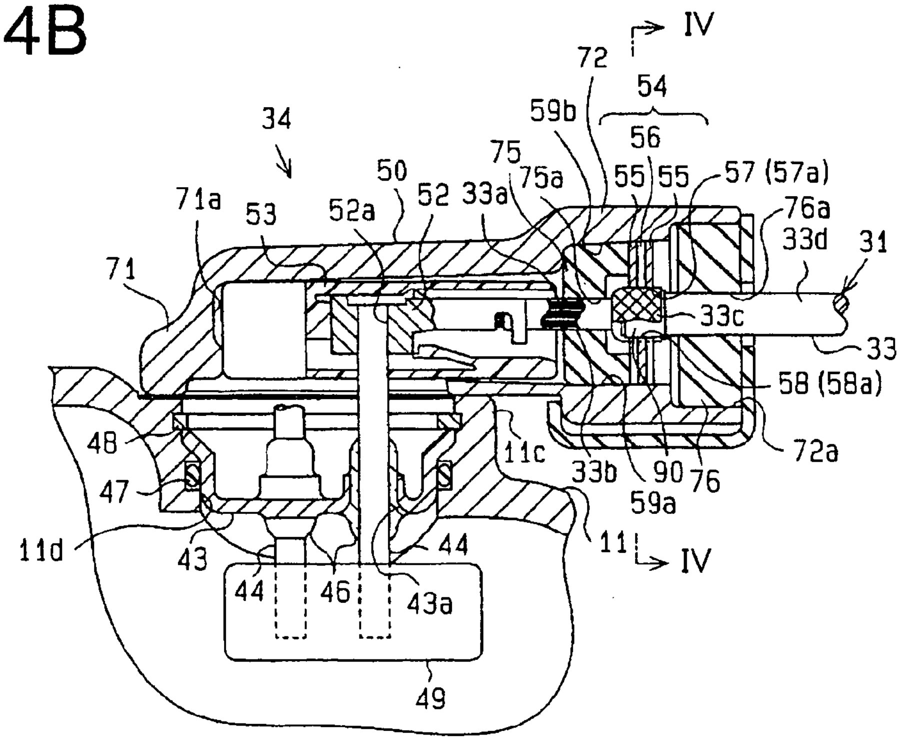
FIG. 4B is a cross-sectional view that is taken along the line III—III in FIG. 4A.

As shown in FIGS. 4A and 4B, the cable fixing portion 66 of the first preferred embodiment is omitted in the second preferred embodiment. Then, the first conducing member 55 doubles as the first fixing member, while the second conducting member 56 doubles as the second fixing member, thus the shield conducting portion 54 doubles as the cable fixing portion. Accordingly, the number of components of the shielded cable 31 is reduced, and the size of the compressor-side connector 34 is reduced.

In the second preferred embodiment, the following components are utilized as the first and second conducting members 55, 56. It is noted that the number of the second conducting member 56 is fewer by one than that of the first preferred embodiment.

Figure 5A:
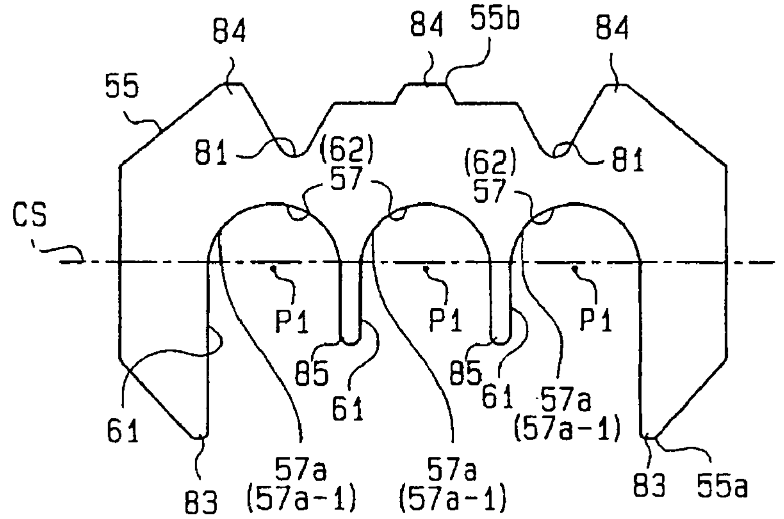
FIG. 5A is a schematic view of a first conducting member according to the second preferred embodiment of the present invention.
Figure 5B:
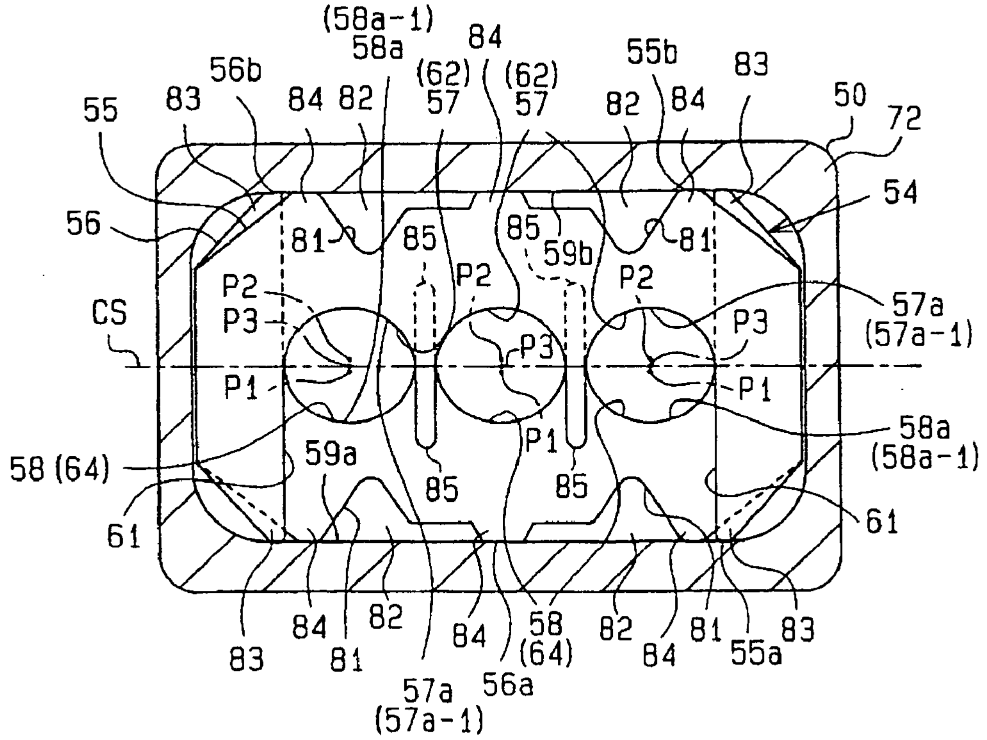
FIG. 5B is a cross-sectional view that is taken along the line IV—IV in FIG. 4B.
Figure 6A:
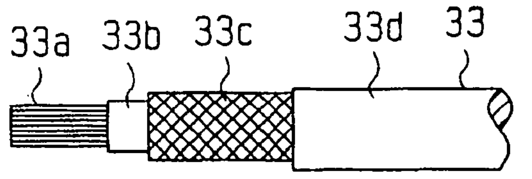
FIG. 6A is a schematic view of a cable body in a state where an electromagnetic shielding portion is exposed according to the second preferred embodiment of the present invention.
Figure 6B:
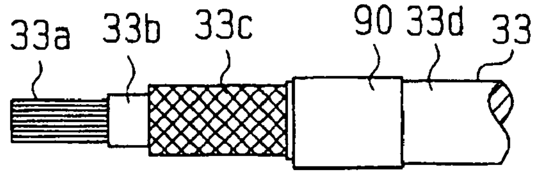
FIG. 6B is a schematic view of the cable body in a state where a reinforcing member is fitted according to the second preferred embodiment of the present invention.
Figure 6C:
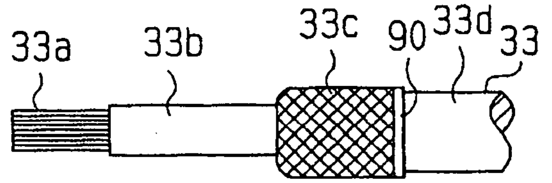
FIG. 6C is a schematic view of the cable body in a state where the electromagnetic shielding portion is folded back according to the second preferred embodiment of the present invention.

As shown in FIGS. 5A and 5B, the first conducting member 55 and the second conducting member 56 are the same in shape, dimension and material, and one plate of the first and second conducting members 55, 56 is rotated or turned relative to the other plate. That is, for example, the first conducting member 55 shown in FIG. 5A is rotated by 180 degrees about an axis perpendicular to the paper, or turned by 180 degrees about the center line CS as an axis thereby to be the second conducting member 56 shown in FIG. 5B.

In order to use a common shape for the first conducting member 55 and the second conducting member 56, each inserting portion 57 of the first conducting member 55, that is, each inserting portion 58 of the second conducting member 56, is formed such that the length of the releasing portions 61, 63, that is, the position of the central axes P1, P2 of the holding portions 62, 64, is predetermined for allowing the central axes P3 of the cable bodies 33 to pass the center line CS. It is noted that except for the components described in the first preferred embodiment, the same reference numerals denote the substantially identical components to those of the first conducting member 55, and description is omitted.

As shown in FIG. 5A, the second end 55$b$ of the first conducting member 55 (which corresponds to the first end 56$a$ of the second conducting member 56) forms therein a guide portion 81 constituted of a recess. As shown in FIG. 5B, in a state where the first conducting member 55 and the second conducting member 56 are layered, the guide portion 81 of one of the first and second conducting members 55, 56 and the inserting portion 57 or 58 of the other of the first and second conducting members 55, 56 cooperatively form a guide space 82 which extends through in the through-thickness direction. That is, in the first and second conducting members 55, 56, the inserting portions 57, 58 constituted of oblong recesses double as guide portions.

The guide space 82 is used for fitting a holding assembly (such as clamp) for holding the layered member when the previously layered first conducting member 55 and the second conducting member 56 are press-fitted into the casing 50. Accordingly, the holding assembly easily holds the layered member constituted of the first conducting member 55 and the second conducting member 56, and the holding assembly is easily pulled off outside the casing 50 after being press-fitted.

As shown in FIGS. 5A and 5B, in the first conducting member 55, the first and second ends 55*a*, 55*b* which are pressed to contact with the first and second press fitting surfaces 59*a*, 59*b* of the casing 50 have press contacting regions with the first and second press fitting surfaces 59*a*, 59*b*, which are divided into plural parts by forming the guide portion 81 and the inserting portion 57, that is, forming the recesses. Then, the portion of the first end 55*a* press-contacting with the first press-fitting surface 59*a* and the portion of the second end 55*b* press-contacting with the second press fitting surface 59*b* are provided by the tops tapering toward the first and second press fitting surfaces 59*a*, 59*b*, respectively.

That is, the first end 55*a* forms therein the three inserting portions 57, and a lip 85 between the adjacent inserting portions 57 (the releasing portions 61) stays away from the first press fitting surface 59*a* by removing its distal end, so that a crimping region 83 against the first press fitting surface 59*a* is separated into two parts near the corners of the first conducting member 55 (rectangle). Then, each crimping region 83 is provided by the protruded top tapering toward the first press fitting surface 59*a* by removing four corners of the first conducting member 55.

Similarly, the second end 55*b* forms therein the two guide portions 81 thereby to divide a crimping region 84 against the second press fitting surface 59*b* into three parts. In these three crimping regions 84, the crimping region 84 between the guide portions 81 is provided by the protruded top tapering toward the second press fitting surface 59*b* as the guide portions 81 are formed to expand toward the second press fitting surface 59*b*. Also, the two crimping regions 84 near the corners of the first conducting member 55 are provided by the protruded tops tapering toward the second press fitting surface 59*b* by the expanding shape of the guide portions 81 and the removal of the four corners of the first conducting member 55.

As shown in FIGS. 4A, 4B and 6A through 6C, one end of each electromagnetic shielding portion 33*c* in the casing 50 is folded back outside the cable body 33 to be double. A ring-shaped cylindrical and metallic reinforcing member 90 is inserted in the doubled electromagnetic shielding portion 33*c* of the cable body 33. The first and second conducting members 55, 56 are pressed to contact with the portion outside the reinforcing member 90 at the doubled electromagnetic shielding portion 33*c*, respectively.

It is noted that in the second preferred embodiment one end of each electromagnetic shielding portion 33*c* is double, while the reinforcing member 90 and the outer insulating layer 33*d* are interposed between the electromagnetic shielding portion 33*c* folded back and the outer insulating layer 33*d*, so that the inserting portions 57, 58 of the first and second conducting members 55, 56 into which the doubled electromagnetic shielding portion 33*c* is inserted are larger in dimension than that of the first preferred embodiment.

According to the second preferred embodiment, in addition to the same advantageous effects as in the first preferred embodiment, the following advantageous effects are obtained.

(9) The first conducting member 55 and the second conducting member 56 have same shape and dimension, and are used such that a plate surface of one of the first and second conducting members 55, 56 is rotated or turned relative to the same plate surface of the other. Accordingly, when the first and second conducting members 55, 56 are manufactured by pressing, the same pressing mold may be used thereby to reduce manufacturing cost. Particularly, in the second preferred, embodiment, the first conducting member 55 and the second conducting member 56 are made of the same material. Accordingly, the first and second conducting members 55, 56 need not be distinguished upon manufacturing thereby to further reduce manufacturing cost.

(10) The portions (the press contacting regions 83, 84), which press-contact with the press fitting surfaces 59*a*, 59*b* of the casing 50 in the outer peripheries of the first and second conducting members 55, 56, are provided by the protruded tops tapering toward the press fitting surfaces 59*a*, 59*b*. Accordingly, when the first and second conducting members 55, 56 are press-fitted into the casing 50, the respective protruded tops positively deform thereby to be easily and firmly press-fitted. It is noted that the matter for manufacturing the casing 50 to tighten interference toward the inner direction of the press fitting is that draft of a core for forming the first and second press fitting surfaces 59*a*, 59*b* is provided on the press fitting surfaces 59*a*, 59*b*.

(11) The reinforcing member 90 is provided for the cable body 33 so as to be interposed in the doubled electromagnetic shielding portion 33*c*. The first and second conducting members 55, 56 are respectively pressed to contact with the portion outside the reinforcing member 90 at the doubled electromagnetic shielding portion 33*c*. Accordingly, force pressing the electromagnetic shielding portion 33*c* by the first conducting member 55 and force pressing the electromagnetic shielding portion 33*c* by the second conducting member 56 are respectively received by the reinforcing member 90. That is, the electromagnetic shielding portion 33*c* is held between the first conducting member 55 and the reinforcing member 90, while being held between the second conducting member 56 and the reinforcing member 90.

Thus, the first and second conducting members 55, 56 are further firmly conducted with the electromagnetic shielding portion 33*c*. Also, force pressing the electromagnetic shielding portion 33*c* by the first and second conducting members 55, 56 is prevented from being transmitted to the conductor 33*a*, thereby, for example, to prevent the inner insulating layer 33*b* and the conductor 33*a* from being deteriorated by stress due to the pressing force applied for a long time. Furthermore, practical deformation, age deterioration and thermal deformation of the inner insulating layer 33*b* and the outer insulating layer 33*d* may prevent the electromagnetic shielding portion 33*c* held by the first and second conducting members 55, 56 from being instable. Accordingly, conduction between the electromagnetic shielding portion 33*c* and the casing 50, and fixing of the cable bodies 33 may be prevented from being instable.

(12) The lip 85 between the adjacent inserting portions 57 (the releasing portions 61) stays away from the first press fitting surface 59*a* by removing the distal end side. Accordingly, in a plurality of the inserting portions 57, the opening on the side of the first press fitting surface 59*a* is shared to be wide. When the cable bodies 33 are inserted into the inserting portions 57 from the side of the first and second conducting members 55, 56, they are initially inserted into the wide opening and then inserted into the respective inserting portions 57. Therefore, in comparison to a structure that the distal end side of the lip 85 is not removed (This embodiment also does not depart from the concept of the present invention.), that is, a structure that the cable bodies 33 are initially and directly inserted into the respective inserting portions 57, insertion work becomes easy.

The present invention is not limited to the embodiments described above but may be modified into the following alternative embodiments.

In the preferred embodiments, both the first and second conducting members 55, 56 are constituted of conductive materials. In an alternative embodiment, one of the first and second conducting members is constituted of a conductive material.

In the preferred embodiments, the casing 50 of the compressor-side connector 34 wholly functions as conductive portion. In an alternative embodiment, for example, substantially the whole casing 50 is made of resin, and a portion with which the shield conducting portion 54 contacts in the casing 50 is made of metal for conducting the shield conducting portion 54 with the electric compressor C.

In the preferred embodiments, the shielded cable 31 that the first and second conducting members 55, 56 are press-fitted into the casing 50 of the compressor-side connector 34 that is connected to the inverter circuit E through the cable 32. In an alternative embodiment, the cable 32 is omitted, and in the shielded cable 31 the opposite end relative to the compressor-side connector 34 is directly connected to the inverter circuit E.

In the second preferred embodiment, the reinforcing member 90 is interposed in the doubled electromagnetic shielding portion 33*c*. In an alternative embodiment, the electromagnetic shielding portion 33*c* is not doubled, and the reinforcing member 90 is interposed between the inner insulating layer 33*b* and the electromagnetic shielding portion 33*c*.

The number of the first and second conducting members 55, 56 is respectively not limited. If the number is one or more, any number of the first and second conducting members 55, 56 may be applicable.

Figure 7A:
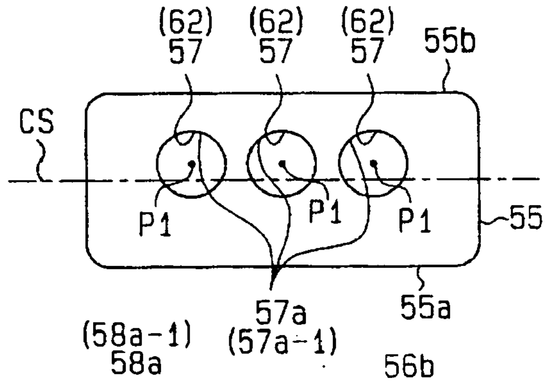
FIG. 7A is a schematic view of a first conducting member according to an alternative embodiment of the present invention.
Figure 7B:
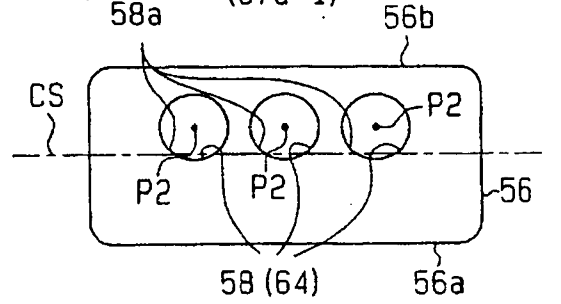
FIG. 7B is a schematic view of a second conducting member according to the alternative embodiment of the present invention.
Figure 7C:
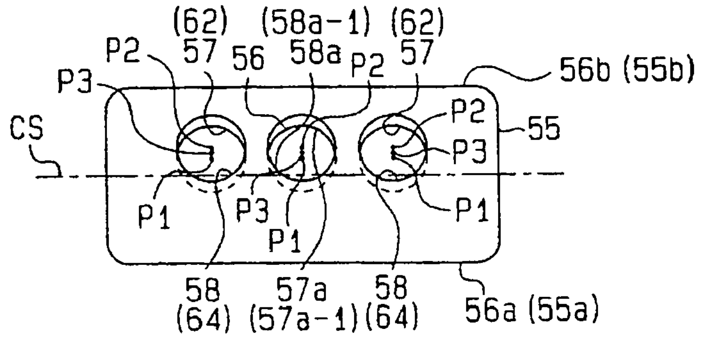
FIG. 7C is a schematic view in a state where the first conducting member and the second conducting member are layered according to the alternative embodiment of the present invention.

In the preferred embodiment, the inserting portions 57, 58 of the respective conducting portions 55, 56 are constituted of oblong recesses. In an alternative embodiment, the inserting portions 57, 58 may be formed by holes. In other words, the releasing portions 61, 63 are omitted, and the holding portions 62, 64 form holes in shape. FIG. 7A shows the first conducting member 55 according to an alternative embodiment of the first preferred embodiment. Likewise, FIG. 7B shows the second conducting member 56. FIG. 7C shows a state where the first and second conducting members 55, 56 are layered. It is noted that the shape of the hole formed in the first and second conducting members 55, 56 is not limited to be circular, but may be triangular or rectangular.

In the preferred embodiments, the first conducting member 55 forms therein the inserting portion 57, while the second conducting member 56 forms therein the inserting portion 58. The exposed portion of the electromagnetic shielding portion 33*c* is held by the inner surfaces 57*a*, 58*a* of both the inserting portions 57, 58. In an alternative embodiment, the inserting portions 57, 58 are not formed. For example, the exposed portion of the electromagnetic shielding portion 33*c* may be held by the substantially rectangular plate-like first conducting member and the substantially rectangular plate-like second conducting member.

The first and second conducting members 55, 56 are not limited to be layered alternately. That is, the first and second conducting members 55, 56 are overlapped in their through-thickness direction to sandwich the electromagnetic shielding portion 33*c*.

The first and second conducting members 55, 56 are not limited to be made of plate material but may, for example, be made of block material.

The cable fixing portion 66 is not limited to be made of metal but may, for example, be made of resin.

In the preferred embodiments, the connector (the compressor-side connector 34) that the first and second conducting members 55, 56 are press-fitted into the casing 50 in the shielded cable 31 is connected to the terminal 44 of the electric compressor C, and the casing 50 is directly in contact with the housing 11 made of a conductive material (metal) in the electric compressor C. That is, the electromagnetic shielding portion 33*c* is grounded through the first and second conducting members 55, 56, the casing 50 and the housing 11 of the electric compressor C in this order.

In an alternative embodiment, the connector that the first and second conducting members 55, 56 are press-fitted into the casing 50 is connected to the terminal provided for the inverter circuit E, while a housing of the inverter circuit E is made of a conductive material (metal), so that the casing 50 is directly in contact with the housing 11 of the inverter circuit E. That is, the electromagnetic shielding portion 33*c* of the shielded cable 31 may be grounded through the first and second conducting members 55, 56, the casing 50 and the housing of the inverter circuit E in this order.

The electrical circuit unit is not limited to the inverter circuit E for supplying the electric motor 13 with electric current. Whatever needs to be electrically connected to the compressor, any application is applicable.

The compressor body is not limited to the electric compressor C driven by the electric motor 13 but may be electrically connected to the electrical circuit unit by the shielded cable. For example, a compressor driven by an engine for traveling a vehicle.

The compression mechanism 12 is not limited to a scroll type. Any type such as a piston type, vane type, a helical type and the like is applicable.

The compressor unit according to the present invention is not limited to be used for a refrigerant circuit but may be used for a vehicle air suspension unit and the like including an air compressor.

The shielded cable according to the present invention is not limited to connect the compressor body of the compressor unit with the electrical circuit unit. As far as the connector includes a casing made of a conductive material and the electromagnetic shielding portion of the cable body is conducted with the casing in the connector, any shielded cable is applicable.

Therefore, the present examples and embodiments are to be considered as illustrative and not restrictive, and the invention is not to be limited to the details given herein but may be modified within the scope of the appended claims.

What is claimed is:

1. A shielded cable comprising:

a cable body providing an electromagnetic shielding portion around a conductive wire thereof;

a connector fitted to one end of the cable body, the connector having a casing including a conducting portion, the electromagnetic shielding portion of the cable body being conducted with the conducting portion of the casing in the connector; and a shield conducting portion provided on the conducting portion of the casing, the shield conducting portion including:

a first conducting member located outside the electromagnetic shielding portion by being press-fitted into the casing for pressing the electromagnetic shielding portion; and a second conducting member located outside the electromagnetic shielding portion by being press-fitted into the casing for pressing the electromagnetic shielding portion in a different direction from the first conducting member, wherein at least one of the first and second conducting members is made of a conductive material, the cable body being held by the first conducting member press-contacting with the electromagnetic shielding portion and the second conducting member press-contacting with the electromagnetic shielding portion, whereby the electromagnetic shielding portion is conducted with the conducting portion of the casing through at least one of the first and second conducting members made of a conductive material, wherein the first and second conducting members respectively are plate-like in shape and are layered in a longitudinal direction of the cable body, the first and second conducting members respectively press contacting with press fitting surfaces of the casing at outer peripheries of the first and second conducting members by being press-fitted into the casing, the first and second conducting members respectively forming inserting portions constituted of oblong recesses or holes into which the cable body is inserted in a through-thickness direction of the first and second conducting members, the first and second conducting members respectively press-contacting with the electromagnetic shielding portion by inner surfaces of the inserting portions, wherein the outer peripheries of the first and second conducting members respectively form guide portions constituted of recesses, the guide portion of the first conducting member and the guide portion of the second conducting member forming a guide space extending through in the through-thickness direction in a state where the first conducting member and the second conducting member are layered.

2. The shielded cable according to claim 1, wherein the first conducting member is plurally formed, the shield conducting portion having a layered structure that the first conducting member is arranged on each side of the second conducting member.

3. The shielded cable according to claim 1, wherein the first conducting member and the second conducting member have the same shape and dimension, the first and second conducting members being used such that a plate surface of one of the first and second conducting members is rotated or turned relative to the same plate surface of the other.

4. The shielded cable according to claim 1, wherein portions press-contacting with the press fitting surfaces of the casing in the outer peripheries of the first and second conducting members are provided by protruded tops tapering toward the press fining surfaces.

5. The shielded cable according to claim 1, further comprising:

a cable fixing portion provided in the casing, the cable fixing portion including:

a first fixing member located outside the cable body by being press-fitted into the casing for pressing the cable body; and a second fixing member located outside the cable body by being press-fitted into the casing for pressing the cable body in a different direction from the first fixing member, wherein the cable body is held by the first fixing member pressing the cable body and the second fixing member pressing the cable body, whereby one end of the cable body is fixed to the connector.

6. The shielded cable according to claim 5, wherein the first conducting member doubles as the first fixing member, while the second conducting member doubles as the second fixing member, whereby the shield conducting portion doubles as the cable fixing portion.

7. The shielded cable according to claim 1, further comprising:

a wire conducting portion provided in the casing for being conducted with the conductive wire of the cable body; and a member provided in the casing between the shield conducting portion and the wire conducting portion for preventing foreign substance from being introduced from the side of the shield conducting portion to the side of the wire conducting portion.

8. The shielded cable according to claim 1, wherein one end of the electromagnetic shielding portion is folded back outside the cable body in the casing, the shielded cable further comprising a ring-shaped reinforcing member fitted to the cable body so as to be interposed in the doubled electromagnetic shielding portion, the first and second conducting members are respectively pressed to contact with a portion outside the reinforcing member in the doubled electromagnetic shielding portion.

9. A compressor unit comprising the components of claim 1, further comprising:

a compressor body;

an electrical circuit unit electrically connected to the compressor body through the shielded cable, the connector being detachably connected to a terminal provided on one of the compressor body and the electrical circuit unit, at least one of the compressor body and the electrical circuit unit having the terminal including a housing made of a conductive material, the connector being connected to the terminal in a state where the casing directly contacts with the housing.

* * * * *